United States Patent
Fujiwara et al.

(10) Patent No.: US 6,683,989 B1
(45) Date of Patent: Jan. 27, 2004

(54) CODING APPARATUS FOR RECODING CODED BIT STREAMS

(75) Inventors: Mitsuaki Fujiwara, Kanagawa-ken (JP); Kazuhiko Morita, Tokyo (JP); Takayuki Sugahara, Kanagawa-ken (JP)

(73) Assignee: Victor Company of Japan, Limited, Yokohama (JP)

( * ) Notice: Subject to any disclaimer, the term of this patent is extended or adjusted under 35 U.S.C. 154(b) by 615 days.

(21) Appl. No.: 09/599,396

(22) Filed: Jun. 22, 2000

(30) Foreign Application Priority Data

Jun. 25, 1999 (JP) .......................... P11-180598

(51) Int. Cl.[7] .................................. G06K 9/36
(52) U.S. Cl. ....................................... 382/239
(58) Field of Search ........................... 382/232, 236, 382/238, 239, 244–253; 348/384.1, 387.1, 390.1, 394.1, 395.1, 403.1, 404.1, 408.1, 419.1, 420.1, 421.1, 424.2, 431.1, 469, 700; 375/240, 240.02, 240.03, 240.12–240.2, 240.22–240.24; 386/109, 111

(56) References Cited

U.S. PATENT DOCUMENTS

| | | | | | |
|---|---|---|---|---|---|
| 5,231,484 | A | * | 7/1993 | Gonzales et al. | 375/240.04 |
| 5,592,226 | A | * | 1/1997 | Lee et al. | 375/240.14 |
| 5,719,986 | A | * | 2/1998 | Kato et al. | 386/109 |
| 5,781,237 | A | * | 7/1998 | Fukuda | 375/240.04 |
| 5,889,561 | A |   | 3/1999 | Kwok et al. | 345/405 |
| 6,151,360 | A | * | 11/2000 | Kato et al. | 375/240.03 |
| 6,167,087 | A | * | 12/2000 | Kato | 375/240.03 |

\* cited by examiner

*Primary Examiner*—Jose L. Couso
(74) *Attorney, Agent, or Firm*—Nath & Associates PLLC; Gary M. Nath; Marvin C. Berkowitz

(57) ABSTRACT

A code amount of each block of primary-coded bit streams and a degree of complexity of image using quantization coefficients, i.e., a degree of difficulty in coding are calculated. Then, recoding is performed by setting a target code amount every block based on the degree of difficulty in coding, and thus secondary-coded bit streams with uniform picture quality can be generated while suppressing the influence of code amount control of the primary-coded bit streams.

9 Claims, 7 Drawing Sheets

CODING APPARATUS FOR RECODING CODED BIT STREAMS

BACKGROUND OF THE INVENTION

1. Technical Field of the Invention

The present invention relates to a coding apparatus for generating the secondary-coded bit streams by recoding the primary-coded bit streams of the previously compressed-coded video signal, for example, to reduce an amount of data. More particularly, the present invention relates to a coding apparatus capable of generating the secondary-coded bit streams, in which the influence of the code amount controlling unit for the primary-coded bit streams can be suppressed and which have uniform picture quality, by calculating an image complexity using the code amount and the quantization coefficients of the primary-coded bit streams every block, then setting a target code amount every block based on the value, and then recoding the bit streams to mate with the target code amount.

2. Description of the Related Art

In the prior art, if image information are transmitted/stored in the digital image process system or the digital image service system, an amount of information can be reduced by coding the image information and then the coded bit streams whose amount of information are reduced are transmitted/stored.

Meanwhile, in recent years, the applications have been increased which generate the secondary-coded bit streams by decoding the image information from the primary-coded bit streams, in which the image are compressed-coded previously, and recoding such image information under different coding conditions with the higher compression ratio, etc., and then transmit/store such secondary-coded bit streams.

For example, in the case where the image information are broadcasted, the cascade transmission of the digital signal, i.e., hierarchical transmission to process one image in plural times is now carried out while executing the edit processes such as collection of image material, primary distribution between the TV stations, secondary distribution to homes, etc. It is expected that, as a variety of broadcasting modes are going to be utilized, the transmission system that differs from the hierarchical transmission and has higher degree of freedom will be spread.

Also, it is expected that, as for the video clip which are stored in the image database, etc. and are expected to be utilized as the library, video sources are provided from many users and utilized by many users at the same time, and also are transmitted/stored again and again while executing the edit of them.

In this manner, the conventional cascade-connected coding system for performing the coding and the decoding in many times is constructed by cascade-connecting the units for performing the coding and the decoding only once as they are to execute the recoding. Hence, upon recoding, the coding using parameters peculiar to the recoding apparatuses is also performed, and thus the coding history of the object image is not considered at all. That is, for example, in the prior art, the processes that take account of only the compression ratio, etc. of the recoding apparatus have been performed upon recoding.

Also, as another example of the recoding application, reproducing/recording on the digital VDR (Video Disc Recorder) may be considered. In the case of this example of the application, the video streams are broadcasted to the user's home at a certain broadcasting quality (e.g., quality which corresponds to a bit rate of 6 Mbps for the standard definition video such as "almost NTSC" or 24 Mbps for the high-definition video such as "almost Hi-vision"). In other words, when receiving these video streams, the user records the video data at a high coding rate, which is similar to the extended reproducing EP mode (long time mode) of the existing home video tape recorder, e.g., the VHS recorder, by using the recoding function of the digital VDR, and thus a number of video programs of low quality are recorded in the digital VDR.

However, only information of higher quality among original signals must be actively employed as much as possible upon recoding. Thus, the picture quality of new signals obtained at a lower bit rate is also requested to have the quality as high as possible. More particularly, in the unit which repeats the coding and the decoding in plural times, preferably the picture quality of the signals obtained by repeating the coding and the decoding in plural times should be set close to the picture quality of the signals which are generated by coding the original video source at a reduced rate only once, for example, as much as possible.

A schematic configuration of the recoding apparatus in the prior art, which generate the secondary-coded bit streams by decoding the primary-coded bit streams being coded previously and then recoding them so as to reduce an amount of data, is shown in FIG. 1.

In this example in FIG. 1, merely major functional elements are illustrated to show a general operation of the recoding apparatus. For example, various type data are contained in the compressed video signal, and only a part of these data are quantized. Other data are caused to detour the requantizing or recoding unit and then multiplexed again with the recoded data in the multiplexer 106. Since it is publicly known generally that the multiplexer 106 is needed to execute the above function and the multiplexing function of the multiplexer 106 is also publicly known, their explanation will be omitted in this disclosure.

In FIG. 1, the primary-coded bit streams that have already been compressed or coded are input into the coded video input terminal 100. That is, these primary-coded bit streams correspond to the signals that are to be recoded in the recoding apparatus shown in FIG. 1.

Here, assume that the primary-coded bit streams to be recoded are the block-coded signals. That is, respective images are divided into a plurality of blocks or macroblocks prior to the coding and then compressed by the predetermined compressing and coding approach every block or macroblock. Therefore, the streams of blocks or macroblocks that are coded at least partially as above are supplied to the coded video input terminal 100. Also, assume that at least a part of the data in respective macroblocks are quantized and are variable-length-coded. As the representative example of the above compressed coding approach, so-called MPEG (Moving Picture Experts Group) 1 system, MPEG 2 system, etc. may be listed.

The above-mentioned primary-coded bit streams being input into the coded video input terminal 100 are then supplied to the variable-length decoder (VLD) 101 that executes the variable-length decoding. In the example in FIG. 1, such a configuration is illustrated that motion vectors contained in the bit streams and other code words which are not quantized are not supplied to the circuits in the succeeding stage (the inverse-quantizing unit ($Q^{-1}$) 103, the quantizing unit (Q) 104, and the variable-length coding unit (VLC) 105) so as to detour them. However, for example, if these units in the succeeding stage (the inverse-quantizing unit 103, the quantizing unit 104, and the variable-length coding unit 105) can be conditioned not to react with signal components which are not. to be changed according to the recoding apparatus, actually these motion vectors and other code words which are not quantized may be set to pass through these units in the succeeding stage (the inverse-quantizing unit 103, the quantizing unit 104, and the variable-length coding unit 105). The code words that are variable-length-decoded by the variable-length decoding unit 101 are delayed by the delay unit 102 by a predetermined time, and then supplied to the inverse-quantizing unit 103.

The inverse-quantizing unit 103 reconstructs the signal components, which are quantized in the compression process, by inverse-quantizing the code words that are subjected to the variable-length decoding. The signal components which are inverse-quantized by the inverse-quantizing unit 103 are then supplied to the quantizing unit 104.

The quantizing unit 104 quantizes (requantizes) signal components being supplied from the inverse-quantizing unit 103 under control of the rate controller 109. At this time, the rate controller 109 controls the quantizing unit 104 such that the secondary-coded bit streams which are recoded to mate with a desired reduced rate can be generated. That is, in the case of this example, the control in recoding by the rate controller 109 is done by supplying quantization values from the rate controller 109 to the quantizing unit 104 such that quantized signals of respective code words which are coarse rather than the original compressed-coding process applied to the primary-coded bit streams can be obtained. The code words that are quantized in the quantizing unit 104 once again are supplied to the variable-length coding unit (VLC) 105.

The variable-length coding unit 105 variable-length-codes the requantized code words, and then supplies the code words obtained after the variable-length coding process to the multiplexer 106.

The multiplexer 106 generates reformatted signals by multiplexing the code words which are obtained after the variable-length coding process with signal components which are not subjected to the recoding because they take a detour via the analyzer 110. The reformatted signals are supplied to the rate buffer 107.

Normally such reformatted signals are burst-like signals. The rate buffer 107 converts the burst-like signals into the constant rate signal. At this time, there is provided to the rate buffer 107 an occupation monitor which supplies the control signal to control the rate controller 109 such that the quantizing unit 104 is conditioned to generate the constant rate signal. The signals that are converted into the constant rate signal by the rate buffer 107 are output from the coded video output terminal 108 as the secondary-coded bit streams that are recoded by the recoding apparatus in FIG. 1.

By the way, in the case of the video compression according to the MPPEG system, the matrix of quantization values and the quantization coefficients are needed in quantization. The matrix of quantization values is decided in compliance with psychological visual parameters. Also, the matrix of quantization values has values corresponding to discrete cosine transform (DCT) coefficients respectively, and normally the matrix is used commonly to quantize all macroblocks in the frame. Meanwhile, the quantization coefficients are peculiar to the macroblock. That is, the quantization coefficients are fitted only to the macroblock to which the concerned quantization coefficients are allocated. Also, the quantization coefficients are utilized to weight all quantization values in the matrix before the matrix is employed to quantize respective macroblocks. In this case, the generation of the quantization parameters means normally the generation of the above quantization coefficients in the following explanation.

The processes in the recoding apparatus in FIG. 1 will be explained in more detail with reference to a flowchart in FIG. 2.

To begin with, the recoding apparatus acquires a new picture (frame) from the primary-coded bit streams as the process in step S100.

Then, the analyzer 110 calculates AC discrete cosine transform coefficients and also counts all coded bits $\Sigma(TB)$ for respective frames, to be described later, as the process in step S101.

Then, in the recoding apparatus, the variable-length decoding unit 101 executes the variable-length decoding and analysis of the frame as the process in step S102.

Here, the variable-length decoding unit 101 is transparent to the code words that have not been subjected to the variable-length coding to thus pass such code words which have not been subjected to the variable-length coding as they are. For example, since the variable-length-coded code words in the signals of the MPEG do not have defined boundaries, the variable-length decoding unit 101 defines boundaries between respective code words and identifies the code words by using the type. The code words determined to have not been subjected to the variable-length coding by the analysis of the variable-length decoder 101 are not actually decoded. Thus, the analyzed pictures to which identifiers are affixed are stored in the delay unit 102 as the process in step S103. The code words analyzed to have not been subjected to the variable-length coding are supplied to the analyzer 110.

In the case of the above example, the profile generating portion 111 in the analyzer 110 generates profiles of the AC discrete cosine transform (DCT) coefficients for overall macroblocks of the compressed frames (fields, images, or the like).

That is, first the profile generating portion 111 in the analyzer 110 generates a present sum of the AC discrete cosine transform coefficient bits every macroblock as the process in step S105, and then stores respective sums which are identified by the macroblock number in the memory 112 as the process in step S104.

Here, a sum for the first macroblock MB1 in the frame (picture) is all bit sum ($\Sigma MB^{AC}_{1}$) of all bit AC discrete cosine transforms in the first macroblock MB1. Also, a sum for the second macroblock MB2 in the frame is an added value of the sum ($\Sigma MB^{AC}_{1}$) in the first macroblock MB1 and all bit sum ($\Sigma MB^{AC}_{2}$) of all bit AC discrete cosine transforms in the second macroblock MB2. Further, a sum for the third macroblock MB3 in the frame is an added value of the sum ($\Sigma MB^{AC}_{1}$) in the first macroblock MB1, the sum ($\Sigma MB^{AC}_{2}$) in the second macroblock MB2, and all bit sum ($\Sigma MB^{AC}_{3}$) of all bit AC discrete cosine transforms in the third macroblock MB3, i.e., a value of ($\Sigma MB^{AC}_{1}$)+($\Sigma MB^{AC}_{2}$)+($\Sigma MB^{AC}_{3}$). In FIG. 3, graphs (expressed as profiles) of all AC coefficients and new target AC coefficient code amount are illustrated, wherein an abscissa denotes the i-th macroblock number MBi in the recoded frame and an ordinate denotes the sum ($\Sigma MB^{AC}_{i}$) in the i-th macroblock number MBi.

Also, in addition to the above AC discrete cosine transform coefficients, the analyzer 110 counts all coded bits $\Sigma(TB)$ for respective frames as the process in step S101.

Then, the analyzer 110 decides whether or not the analysis of all macroblocks for respective frames has been completed, as the process in step S106. Then, if all macroblocks have been analyzed, the analyzer 110 calculates a new target value TVAC of the AC discrete cosine transform per frame in compliance with the relation given by following Eq.(1), as the process in step S108.

$$TV^{AC} = (\Sigma MB^{AC}{}_{last}) - \% \times \Sigma(TB) - B_{EXCESS} \qquad (1)$$

Where $(\Sigma MB^{AC}{}_{last})$ in Eq.(1) is a sum of the AC discrete cosine transform coefficients up to the last macroblock, and corresponds to a total amount of data of the AC discrete cosine transform bits in the frame. Also, $\Sigma(TB)$ in Eq.(1) is all coded bits in the frame, and represents difference between the code amount generated in the preceding frame and the target code amount. Further, % in Eq.(1) is a ratio for reducing a rate of the coded bit stream. For example, if the code amount which is not dependent on the quantization coefficients (quantization-coefficient-independent code amount) is 2.0 Mbps when the primary-coded bit stream P of 8 Mbps is recoded into the secondary-coded bit stream S of 4 Mbps, the quantization-coefficient-dependent code amount of the primary-coded bit frame P which is to be recoded becomes 6.0 Mbps. Therefore, the secondary-coded bit stream S as the result of the recoding is 4−2=2 Mbps, and thus the quantization-coefficient-dependent code amount can be reduced from 6 Mbps to 2 Mbps. Accordingly, % in Eq.(1) can be given by $$\% = (1 - 2/6) = 2/3 \qquad (2)$$

Then, the scaling of the profile of the AC discrete cosine transform bits is carried out based on a coefficient ratio given by Eq.(3), as the process in step S109.

$$\text{ratio} = TV^{AC}/\Sigma MBAC_{last} \qquad (3)$$

In order to get the profiles that are linearly scaled as shown in FIG.3, such scaling is performed by multiplying the sum $(\Sigma MB^{AC}{}_i)$ by the coefficients ratio respectively. In other words, the scaling is carried out based on Eq.(4).

$$TV^{AC}{}_i = \text{ratio} * \Sigma MB^{AC}{}_i \qquad (4)$$

Where $TV^{Ac}{}_i$ in Eq.(4) is the target code amount until the i-th macroblock Mbi.

Then, the sum $(\Sigma MB^{AC}{}_i)$ can be replaced with the scaled sum in the memory 112, as given by following Eq.(5).

$$TV^{AC}{}_i = TV^{AC}/\Sigma MB^{AC}{}_{last} * \Sigma MB^{AC}{}_i \qquad (5)$$

After the profiles have been scaled as described above in the recoding apparatus in FIG. 1, the code words which have been analyzed but have not been subjected to the variable-length coding respectively are input/output into/from the memory 112 in macroblock unit at a time. The code words that have not been subjected to the AC discrete cosine transform are supplied to the multiplexer 106. The multiplexer 106 constructs essentially the outputs once again.

Also, the analyzer 110 conditions the memory 112 to send the code words to the rate buffer 107, and also conditions the rate buffer 107 to receive a limited amount of the code words per macroblock.

The target code amount $TV^{AC}{}_{last}$ derived finally until the final macroblock is supplied to the rate controller 109 to recode the current frame.

Further, the signals that are variable-length-coded by the variable-length decoding unit 101 and stored in the delay unit 102 once are accessed by the delay unit 102 and then inversely quantized by the inverse-quantizing unit 103 as the process in step S110. Then, under control of the rate controller 109 which employs the target code amount $TV^{AC}{}_{last}$ calculated as above, the signals are requantized by the quantizing unit 104 to mate with the target code amount $TV^{AC}{}_{last}$, and then variable-length-coded by the variable-length coding unit 105, as the process in step S111.

Now, quantization coefficients Q employed in requantization in the quantizing unit 104 will be set as follows.

In the recoding apparatus in FIG. 1, an evaluation value $(Q_N i)$ of the quantization coefficients Q in the i-th macroblock MBi is set, as the process in step S112. A new quantization coefficients $Q_N i$ of the i-th macroblock Mbi can be expresses by Eq.(6).

$$Q_n i = Q_{MB} in / (1 - \%) \qquad (6)$$

Where $Q_{MB} in$ is input quantization coefficients. This Eq.(6) can be satisfied under the assumption that the quantization coefficients are in inverse proportion to the generated code amount.

In the process procedures in FIG. 2, after the evaluation value $(Q_N i)$ of the quantization coefficients Q in the i-th macroblock MBi has been acquired in the process in step S112, the non-quantized macroblock Mbi is accessed from the delay unit 102, as the process in step S113.

Then, in the quantizing unit 104 of the recoding apparatus in FIG.1, the i-th macroblock Mbi is quantized by using the evaluated quantization coefficients $(Q_N i)$, as the process in step S114.

Then, in the variable-length coding unit 105 of the recoding apparatus in FIG. 1, the macroblock quantized by the quantizing unit 104 is variable-length-coded, as the process in step S115.

Next, in the process procedure in FIG. 2, new all bits $\Sigma MB^{AC} in$ for the macroblock are added, as the process in step S116. Then, the code words of the requantized macroblock are reconstructed, as the process in step S117. Then, in order to form a profile value $\Sigma(\Sigma MB^{AC} in)i$ of present macroblock of the coded bit streams which are requantized and recorded, bit sums $\Sigma MB^{AC} in$ are added to bit sums of the previously quantized macroblock.

Then, a difference between the new profile value $\Sigma(\Sigma MB^{AC} in)I$ and the original scaled profile value $\Sigma(\Sigma MB^{AC} i)I$ is calculated based on following Eq.(7) to generate a value $\Delta E$ of bit error, as the process in step S119.

$$\text{error } \Delta E = \Sigma\Sigma MB^{AC} i - \Sigma\Sigma MB^{AC} in \qquad (7)$$

Then, the bit error $\Delta E$ is compared with a threshold value $\Delta E_{TH}$, as the process in step S120. If the bit error $\Delta E$ is larger than the threshold value $\Delta E_{TH}$ in the comparison in step S120, new quantization coefficients $Q_N i$ is calculated as the process in step S121. As an example, the new quantization coefficients $Q_N i$ is calculated in compliance with the relationship in following Eq.(8).

$$Q_n i = Q_n i + \text{sgn}(\Delta E) \qquad (8)$$

In this case, $Q_N i$ in Eq.(8) corresponds to the last qunatization coefficients employed in the i-th macroblock and is equal to $Q_N i$ in the first path, and $\text{sgn}(\Delta E)$ in Eq.(8) coincides with ±1 respectively if the bit error $\Delta E$ is positive and negative. More particularly, $Q_N i$ calculated as $Q_n i = Q_{MB} in / (1 - \%)$ based on Eq.(8) can be given by Eqs.(9) and (10).

$$\Delta E < 0: Q_n i = Q_n i + 1 \qquad (9)$$

$$\Delta E > 0: Q_n i = Q_n i - 1 \qquad (10)$$

After the process in step S121, the i-th macroblock Mbi is accessed again by the delay unit 102 as the process in step S113, and then requantized by using the new quantization coefficients $Q_Ni$ as the process in step S114. The processes in step S113 to step S121 are repeated until the bit error $\Delta E$ becomes smaller than the threshold value $\Delta E_{TH}$.

In contrast, if it is decided in step S120 that the bit error $\Delta E$ is smaller than the threshold value $\Delta E_{TH}$, it is decided whether or not all macroblocks in the frame have been requantized, as the process in step S122. If it is decided in step S122 that all macroblocks in the frame have not been requantized, the number of the i-th macroblock (index i) is incremented one by one as the process in step S118. Then, the process returns to step S112 and the requantizing process of the (i+1)-th macroblock Mb(i+1) is started.

On the contrary, if it is decided in step S122 that all macroblocks in the frame have been requantized, the process of the recoding apparatus jumps to step S100 and then the process of the succeeding frame is started.

By the way, in the foregoing recoding apparatus in the prior art, the problem hardly occurs if the original primary-coded bit streams are coded in requantization according to the optimal distribution method of the code amount. However, it cannot always be detected whether or not such original primary-coded bit streams can be coded under the optimal distribution of code amount, for the case may be considered where, in order to control the bit streams into a certain restricted transfer rate according to a generated bit amount in the preceding primary coding, the bit streams have been subjected to the rate control based on the quantization coefficients and thus such bit streams have been coded by using the quantization coefficients which are different from the quantization coefficients essentially employed to make the picture quality uniform. Therefore, the uniform picture quality (substantially the uniform in-picture quantizing scale) cannot be obtained because of such rate control. As a result, in some cases the coding distortion due to the compression becomes remarkable if the bit streams are recoded.

SUMMARY OF THE INVENTION

The present invention has been made in view of the above subjects, and it is an object of the present invention to provide a coding apparatus capable of generating the secondary-coded bit streams which contain less picture quality degradation after the recoding, by executing the optimum in-picture code amount distribution to make the picture quality uniform when the primary-coded bit streams in which the image data do not exist prior to the compressing and coding is recoded.

In order to achieve the above object, there is provided a coding apparatus for generating secondary-coded bit streams by decoding primary-coded bit streams which are coded and then recoding the decoded primary-coded bit streams, comprising: a bit stream introducing means for introducing primary-coded bit streams at least in predetermined units; a coding difficulty degree calculating means for calculating a degree of difficulty in coding a predetermined block in the predetermined units; a profile generating means for generating accumulative profiles based on the degree of difficulty in the coding; and a scaling means for executing scaling of the profiles every predetermined block.

According to the coding apparatus according to the present invention, in the case that the secondary-coded bit streams which do not include data prior to the coding are recoded by introducing the primary-coded bit streams at least in predetermined units, then calculating a degree of difficulty in coding a predetermined block in the predetermined units, then generating accumulative profiles based on the degree of difficulty in the coding, and then executing the scaling of the profiles every predetermined block, it is possible to generate the secondary-coded bit streams which contain small degradation of the quality.

In the preferred embodiment of the present invention, the coding difficulty degree calculating means calculates the degree of difficulty in the coding based on orthogonal transformation coefficients of the predetermined block.

According to this embodiment, since the coding difficulty degree is calculated based on the orthogonal transformation coefficients of the predetermined blocks, the data prior to coding can be estimated based the primary-coded bit streams which do not contain the data prior to the coding. As a result, it is possible to generate the secondary-coded bit streams that contain small degradation of the quality.

In the preferred embodiment of the present invention, the coding difficulty degree calculating means calculates the degree of difficulty in the coding by using a sum of code amounts of all predetermined blocks at least in the predetermined units and quantization coefficients of each predetermined block.

According to this embodiment, since the coding difficulty degree is calculated by using a sum of code amounts of all predetermined blocks at least in the predetermined units and quantization coefficients of each predetermined block, the data prior to coding can be estimated based the primary-coded bit streams which do not contain the data prior to the coding. As a result, it is possible to generate the secondary-coded bit streams that contain small degradation of the quality.

In the preferred embodiment of the present invention, a sum of code amount of all predetermined blocks in the predetermined units represents a code amount of orthogonal transformation coefficients which are dependent on quantization coefficients of each predetermined block in the predetermined units.

According to this embodiment, since a sum of code amount of all predetermined blocks in the predetermined units represents a code amount of orthogonal transformation coefficients that are dependent on quantization coefficients of each predetermined block in the predetermined units, a degree of difficulty in coding can be easily calculated. As a result, the data prior to the coding can be easily estimated and the secondary-coded bit streams that contain small degradation of the quality can be generated.

In the preferred embodiment of the present invention, a difference between a code amount obtained by recoding at least one predetermined unit and a current target code amount is added to a next target code amount in predetermined units to be recoded in future.

According to this embodiment, since a difference between a code amount obtained by recoding at least one predetermined unit and a current target code amount is added to a next target code amount in predetermined units to be recoded in future, the high quality secondary-coded bit streams can be generated by suppressing sudden degradation of the quality when the primary-coded bit streams which include no data prior to the coding are recoded.

In the preferred embodiment of the present invention, a value obtained by dividing difference between a code amount generated in preceding predetermined units and the target code amount by a total sum of the target code amounts of respective predetermined units is distributed to the target code amount of at least one predetermined unit.

According to this embodiment, since the value obtained by dividing difference between the code amount generated in preceding predetermined units and the target code amount by the total sum of the target code amounts of respective predetermined units is distributed to the target code amount of at least one predetermined unit, propagation of the error in predetermined unit can be distributed. Thus, when the primary-coded bit streams which include no data prior to the coding are recoded, the high quality secondary-coded bit streams can be generated by suppressing sudden degradation of the quality.

Also, in order to achieve the above object, there is provided a coding apparatus for generating secondary-coded bit streams by decoding primary-coded bit streams which are coded and then recoding the decoded primary-coded bit streams, comprising: a bit stream introducing means for introducing primary-coded bit streams at least in predetermined units; and a scaling means for scaling of each predetermined block in the predetermined units based on a code amount of orthogonal transformation coefficients of the predetermined block, wherein a lowest target code amount is set for the code amount of the orthogonal transformation coefficients in the predetermined units.

According to the coding apparatus according to the present invention, since the lowest target code amount is set for the code amount of the orthogonal transformation coefficients in the predetermined units by introducing primary-coded bit streams at least in predetermined units, and then executing the scaling of each predetermined block in the predetermined units based on the code amount of orthogonal transformation coefficients of predetermined block, oscillation which is ready to occur when the error of the code amount is small can be prevented when the primary-coded bit streams which include no data prior to the coding are recoded. Thus, it is possible to generate easily the secondary-coded bit streams that contain small degradation of the quality.

In the preferred embodiment of the present invention, a difference between a code amount obtained by recoding at least one predetermined unit and a current target code amount is added to a next target code amount in predetermined units to be recoded in future.

According to this embodiment, since a difference between a code amount obtained by recoding at least one predetermined unit and a current target code amount is added to a next target code amount in predetermined units to be recoded in future, the high quality secondary-coded bit streams can be generated by suppressing sudden degradation of the quality when the primary-coded bit streams which include no data prior to the coding are recoded.

In the preferred embodiment of the present invention, a value obtained by dividing difference between a code amount generated in preceding predetermined units and the target code amount by a total sum of the target code amounts of respective predetermined units is distributed to the target code amount of at least one predetermined unit.

According to this embodiment, since the value obtained by dividing difference between the code amount generated in preceding predetermined units and the target code amount by the total sum of the target code amounts of respective predetermined units is distributed to the target code amount of at least one predetermined unit, propagation of the error in predetermined unit can be distributed. Thus, when the primary-coded bit streams which include no data prior to the coding are recoded, the high quality secondary-coded bit streams can be generated by suppressing sudden degradation of the quality.

The nature, principle and utility of the invention will become more apparent from the following detailed description when read in conjunction with the accompanying drawings.

DESCRIPTION OF THE PREFERRED EMBODIMENTS

Embodiments of the present invention will be explained with reference to the accompanying drawings hereinafter.

Figure 4:
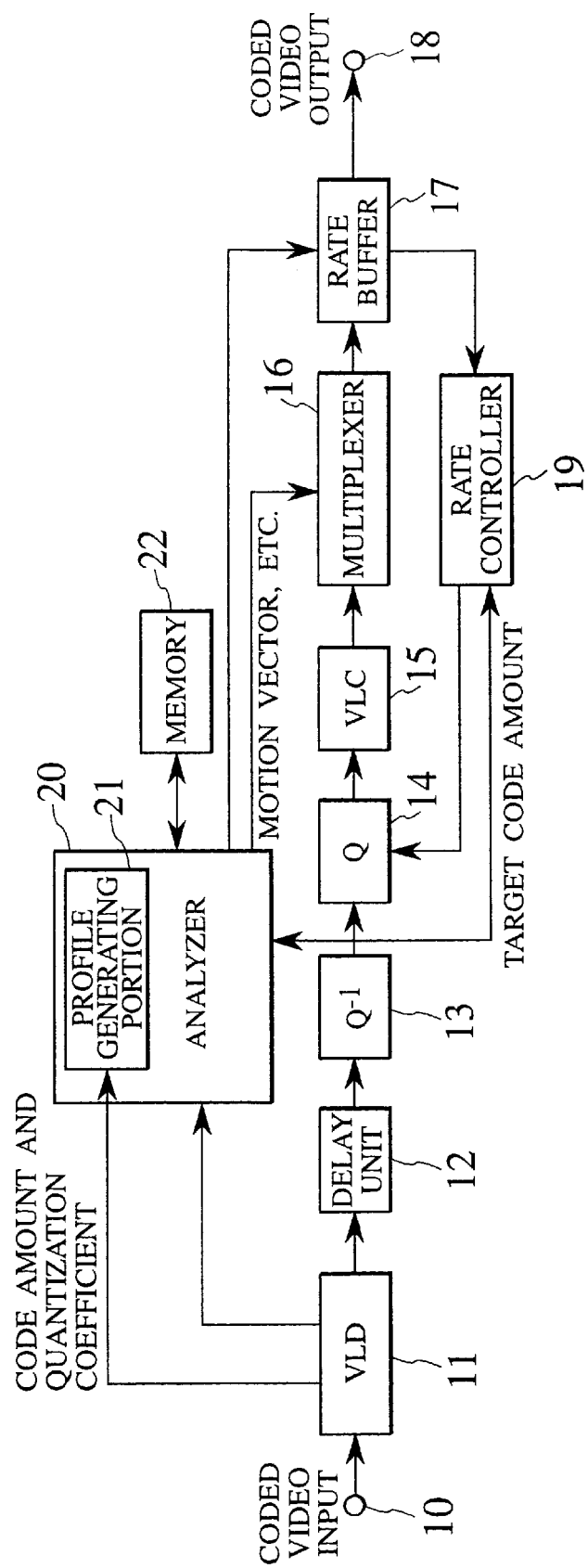
FIG. 4 is a block diagram showing a schematic configuration of a recoding apparatus according to a first embodiment of the present invention.

A schematic configuration of the recoding apparatus according to an embodiment of the present invention, which generate the secondary-coded bit streams by decoding the primary-coded bit streams being coded previously and then recoding them so as to reduce an amount of data, is shown in FIG. 4.

Figure 1:
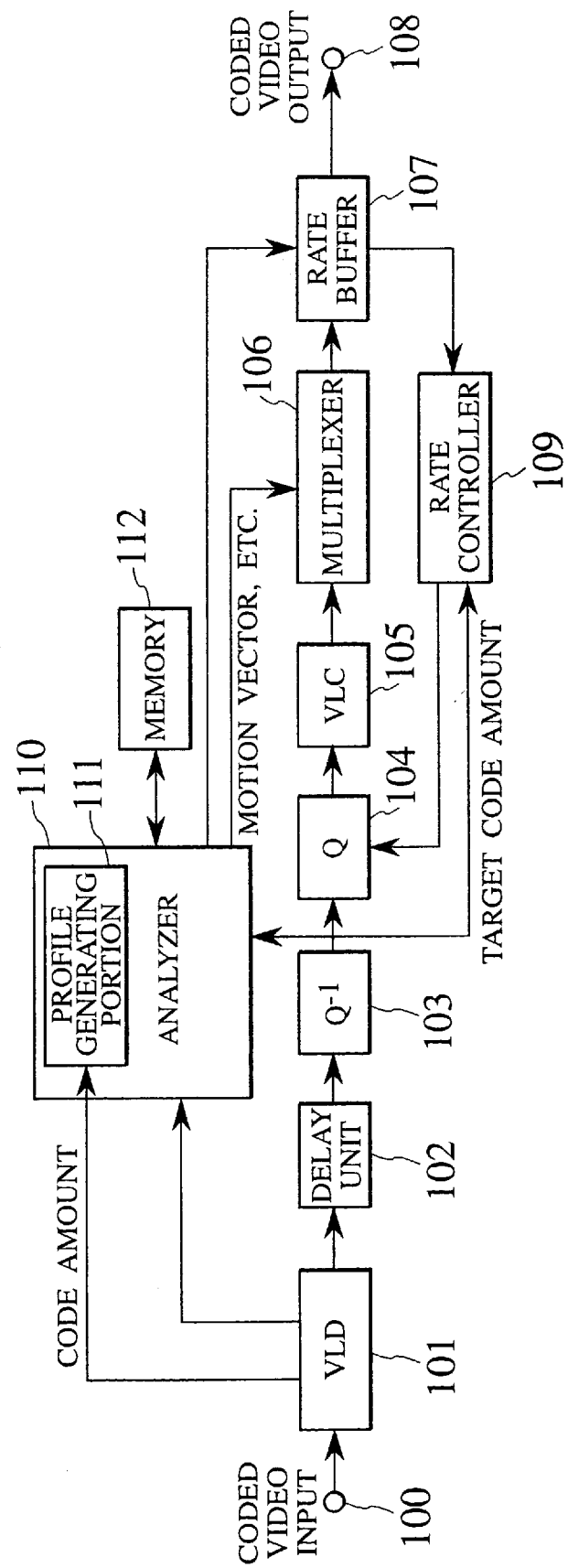
FIG. 1 is a block diagram showing a schematic configuration of a recoding apparatus in the prior art.
Figure 2:
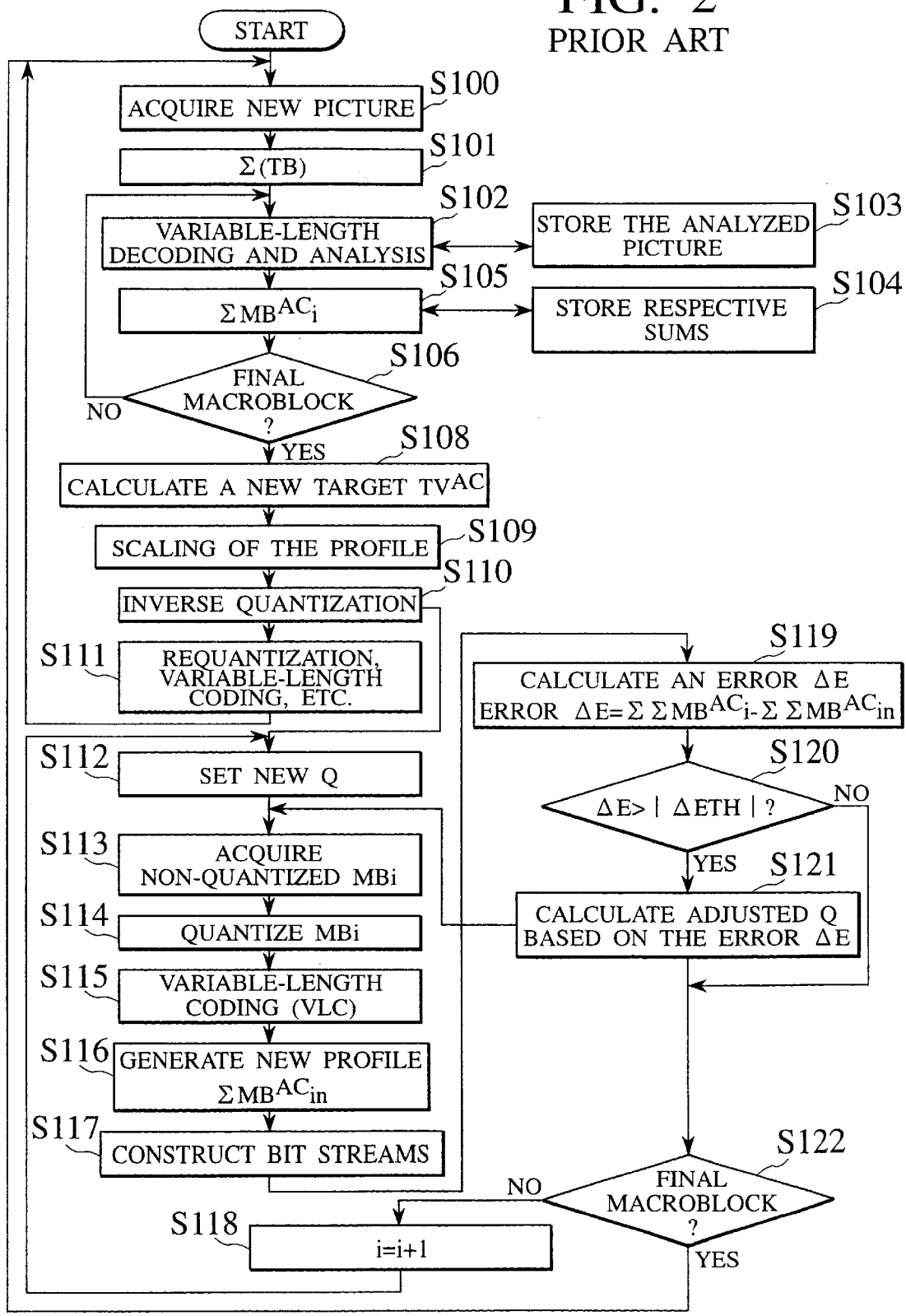
FIG. 2 is a flowchart showing flows of process in the recoding apparatus in the prior art.
Figure 3:
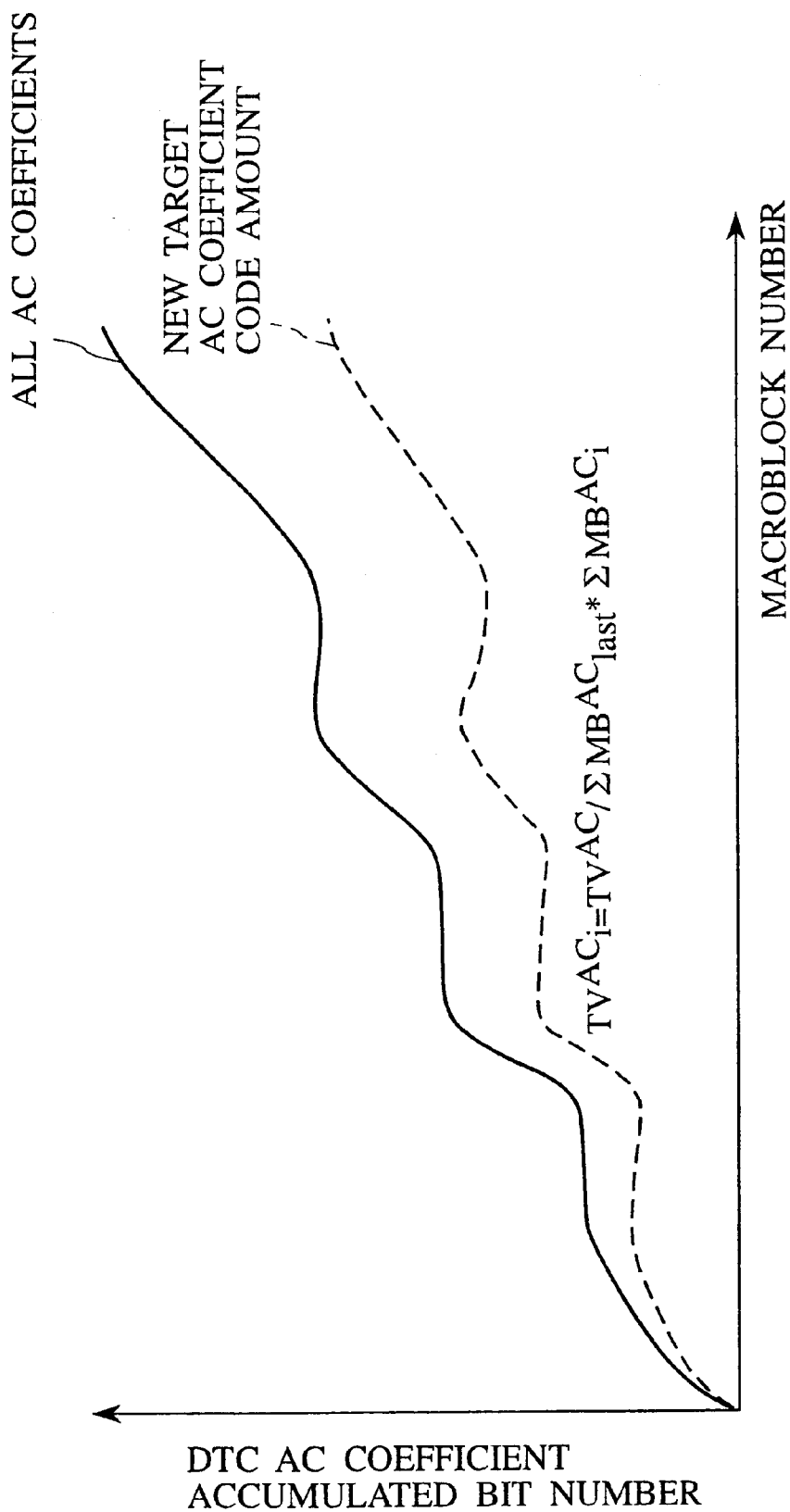
FIG. 3 is a graph employed in explanation of a profile generated by a profile generating portion in an analyzer of the recoding apparatus in the prior art.

In this example in FIG. 4, like the above conventional example shown in FIG. 1, merely major functional elements are illustrated to show a general operation of the recoding apparatus. That is, for example, various type data are contained in the compressed video signal, and only a part of these data are quantized. Other data are caused to detour the requantizing or recoding unit and then multiplexed again with the recoded data in the multiplexer 16. Since the function of the multiplexer 16 is publicly known, its explanation will be omitted in this disclosure.

In FIG. 4, the primary-coded bit streams that have already been compressed or coded are input into the coded video input terminal 10. The primary-coded bit streams correspond to the signals that are to be recoded in the recoding apparatus shown in FIG. 4. In the present embodiment, assume that the primary-coded bit streams to be recoded are the block-coded signals. That is, respective images are divided into a plurality of blocks or macroblocks prior to the coding and then compressed by the predetermined compressing and coding approach every block or every macroblock. Therefore, the streams of blocks or macroblocks that are coded at least partially as above are supplied to the coded video input terminal 10. Also, assume that at least a part of the data in respective macroblocks are quantized and are variable-length-coded. In the present embodiment, so-called MPEG 1 system, MPEG 2 system, etc. may also be listed as the representative example of the above compressing and coding approach.

The above-mentioned primary-coded bit streams being input into the coded video input terminal 10 are then supplied to a variable-length decoding unit (VLD) 11 that executes the variable-length decoding. In the example in FIG. 4, such a configuration is illustrated that the motion vectors contained in the primary-coded bit streams and other code words which are not quantized are not supplied to the circuits in the succeeding stage (an inverse-quantizing unit ($Q^{-1}$) 13, a quantizing unit (Q) 14, and a variable-length coding unit (VLC) 15) so as to detour them. However, for example, if these units in the succeeding stage (the inverse-quantizing unit 13, the quantizing unit 14, and the variable-length coding unit 15) can be conditioned not to react with signal components which are not to be changed according to the recoding apparatus, actually these motion vectors and other code words which are not quantized may be set to pass through these units in the succeeding stage (the inverse-quantizing unit 13, the quantizing unit 14, and the variable-length coding unit 15). The code words that are variable-length-decoded by the variable-length decoding unit 11 are delayed by a delay unit 12 by a predetermined time, and then supplied to the inverse-quantizing unit 13.

The inverse-quantizing unit 13 reconstructs the signal components, which are quantized in the compression process, by inverse-quantizing the variable-length-decoded code words. The signal components that are inverse-quantized by the inverse-quantizing unit 13 are then supplied to the quantizing unit 14.

The quantizing unit 14 quantizes (requantizes) the signal components supplied from the inverse-quantizing unit 13 under control of a rate controller 19. At this time, the rate controller 19 controls the quantizing unit 14 such that the secondary-coded bit streams which are recoded to mate with a desired reduced rate can be generated. That is, in the case of this example, the control in recoding by the rate controller 19 is carried out by supplying quantization values from the rate controller 19 to the quantizing unit 14 such that quantized signals of respective code words which are coarser than the original compressing and coding process applied to the primary-coded bit streams can be obtained. The code words that are quantized in the quantizing unit 14 once again are supplied to the variable-length coding unit (VLC) 15.

The variable-length coding unit 15 variable-length-codes the requantized code words, and then supplies to the multiplexer 16 the code words that are obtained after the variable-length coding process.

The multiplexer 16 generates reformatted signals by multiplexing the code words which are obtained after the variable-length coding process with signal components which are not subjected to the recoding because they take a detour via the analyzer 20. The reformatted signals are supplied to a rate buffer 17.

Here, normally such reformatted signals are burst-like signals. The rate buffer 17 converts the burst-like signals into the constant rate signal. At this time, there is provided to the rate buffer 17 an occupation monitor that supplies the control signal to control the rate controller 19 such that the quantizing unit 14 is conditioned to generate the constant rate signal. The signals that are converted into the constant rate signals by the rate buffer 17 are output from the coded video output terminal 18 as the secondary-coded bit streams that are recoded by the recoding apparatus in the present embodiment shown in FIG. 4.

The basic operation of the above recoding apparatus is substantially similar to the above-mentioned example in FIG. 1. However, in the case of the recoding apparatus according to the present embodiment, an operation of an in-picture (frame) profile generating portion 21 in an analyzer 20 is different.

More specifically, the profile generating portion 21 in the analyzer 20 calculates the target code amount $TV^{AC}$ of the picture (frame) in compliance with the relationship given in above Eq.(1). In the case of the recoding apparatus according to the present embodiment, further the lowest target code amount $TB_{min(typ)}$ is set every picture type (e.g., I-picture (Intra-coded picture), P-picture (Predictive-coded picture), or B-picture (Bidirectionally predictive-coded picture) in MPEG).

In this case, if the target code amount $TV^{AC}$ of the AC discrete cosine transform per frame has a very small value (e.g., close to the still picture, etc.), for example, control response of the rate controller 19 is accelerated. Therefore, the quantization coefficients are varied even by the small error in the code amount and thus the oscillation occurs easily. In the present embodiment, it is intended to prevent the oscillation by setting the lowest target code amount $TB_{min(typ)}$ every picture type. In addition, for simplification, the lowest target code amount that is not classified according to the picture type may be set.

As described above, in the case of the present embodiment, the target code amount $TV^{AC}$ of the picture can be given by following Eq.(11) by using the lowest target code amount $TB_{min(typ)}$ every picture type.

$$TV^{AC}=MAX(TV^{AC}, TB_{min(typ)}) \quad (11)$$

Where MAX(A,B) in Eq.(11) is a function for returning a larger value of A and B. For example, if A>B, MAX(A,B) represents to return a value of A.

In the above profile generating portion 111 in the analyzer 110 of the recoding apparatus in the prior art in FIG. 1, the in-picture (frame) profiles are generated by the quantization-coefficient-independent AC coefficients. In contrast, in the profile generating portion 21 in the analyzer 20 according to the embodiment of the present invention, the profile employing the power of the product of the generated code amount $\Sigma MB^{AC}i$ per macroblock of the original primary-coded bit streams and the in-picture quantization coefficients Qi are utilized. That is, in the analyzer 20 of the present embodiment, as given in following Eq.(12), a degree Xi of difficulty in coding the i-th macroblock Mbi is utilized.

$$Xi=(\Sigma MB^{AC}i*Qi)^{\alpha} \quad (12)$$

Where α in Eq.(12) is (0<α≦1).

The reason for doing the above in the recoding apparatus of the present embodiment will be explained in the following.

In general, in the i-th macroblock Mbi, the macroblock with the small sum ($\Sigma MB^{AC}i$) is ready to code, and the macroblock with the small quantization coefficients Qi is also ready to code. Normally it is known that, as the coding of the macroblock Mbi becomes more difficult, it is more difficult for a human visual sense to sense the coding distortion. Hence, if the sum $\Sigma MB^{AC}i$ or the quantization coefficients Qi becomes large, the target code amount of the macroblock Mbi may not be set so large. For this reason, a function that does not increase so much the target code amount $TV^{AC}$ of the AC discrete cosine transform coefficients must be employed.

Figure 5:
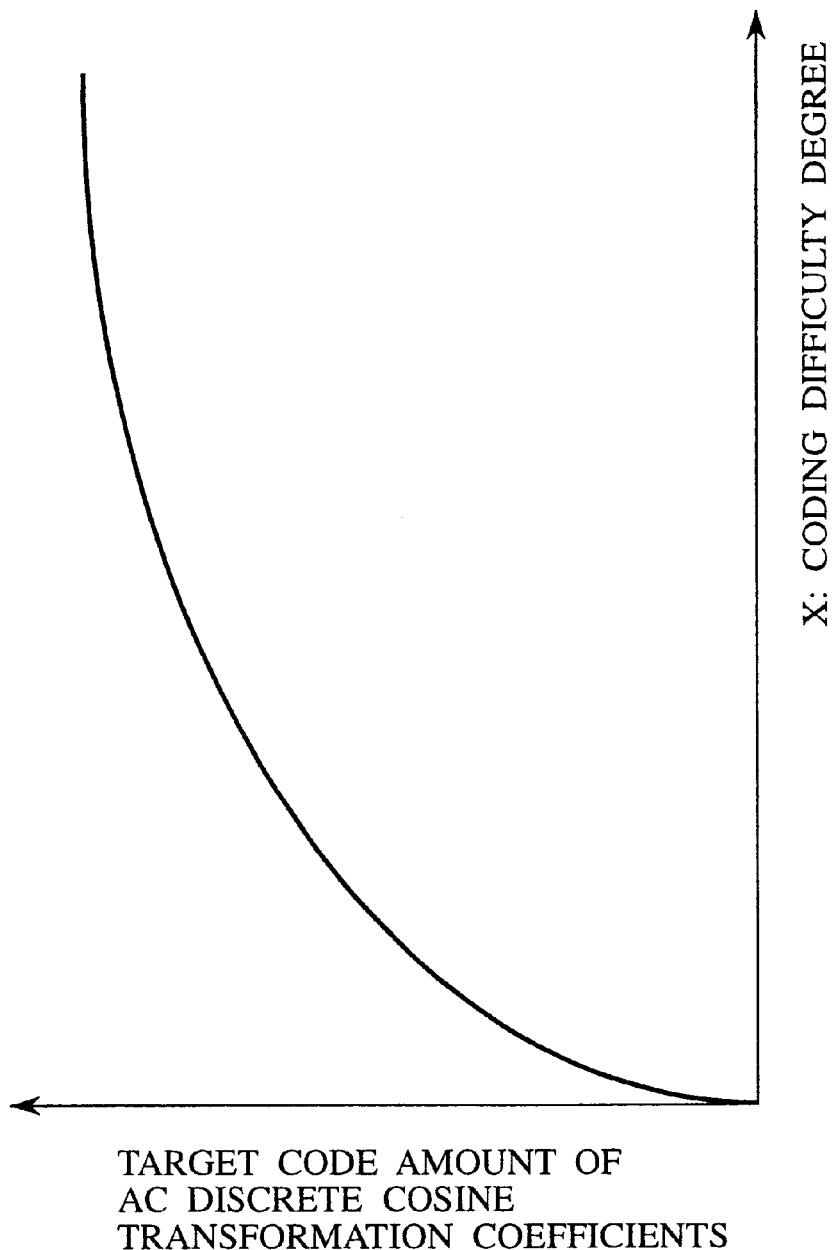
FIG. 5 is a graph employed in explanation of a coding degree-of-difficulty function, which mates with the human sense in the logarithmic function scale, employed in the recoding apparatus according to the first embodiment of the present invention.

In the embodiment of the present invention, the coding difficulty degree Xi in Eq.(12) is employed as an example of such function. In addition, it is preferable that a function which can mate with the human sense in the logarithmic function scale, as given in following Eq.(13), etc., and shown in FIG. 5, should be employed.

$$Xi = LOG(\Sigma MB^{AC}i * Qi + B) + A \qquad (13)$$

Where A and B in Eq.(13) are a constant respectively.

That is, in the analyzer 20 of the recoding apparatus of the embodiment of the present invention, the product of the target code amount $TV^{AC}$ of the picture and the coding difficulty degree Xi of the i-th macroblock is scaled by a total sum of the coding difficulty degree in all macroblocks in the picture.

In other words, the target code amount $\Sigma TMBi(TV^{AC}i)$ until the i-th macroblock MBi can be given by $$\Sigma TMBi(TV^{AC}i) = \Sigma Xi * TV^{AC}/\Sigma X_{last} \qquad (14)$$

Next, processes in the recoding apparatus according to the first embodiment of the present invention will be explained in more detail with reference to a flowchart in FIG. 6 hereunder.

At first, the recoding apparatus acquires a new picture (frame) from the primary-coded bit streams, as the process in step S10. Then, the analyzer 20 calculates the AC discrete cosine transform coefficients and also counts all coded bits $\Sigma(TB)$ for respective frames, as the process in step S11. Then, in the recoding apparatus, the variable-length decoding unit 11 executes the variable-length decoding and analysis of the frame, as the process in step S12.

Here, the variable-length decoding unit 11 is transparent to the code words that have not been subjected to the variable-length coding to thus pass such code words that have not been subjected to the variable-length coding as they are. For example, since the variable-length-coded code words in the signals of the MPEG do not have defined boundaries, the variable-length decoding unit 11 defines boundaries between respective code words and then identifies the code words by using the type. The code words are not actually decoded, and the code words that have been analyzed by the variable-length decoder 11 but have not been subjected to the variable-length coding are stored in the delay unit 12 after identifiers are affixed to the code words, as the process in step S13.

The code words that have been analyzed but have not been subjected to the variable-length coding are supplied to the analyzer 20. The analyzer 20 calculates the coding difficulty degree Xi according to Eq.(12) or Eq.(13), as the process in step S15, and then calculates a total sum $\Sigma xi$ of the coding difficulty degree Xi and stores them in the memory 22, as the process in step S14.

Then, the analyzer 20 decides whether or not all macroblocks for respective pictures have been analyzed, as the process in step S16. Then, if it is decided that all macroblocks have been analyzed, the process goes to step S18.

In step S18, the profile generation portion 21 in the analyzer 20 calculates the target code amount $TV^{AC}$ of the AC discrete cosine transform coefficients per picture according to Eq.(1) or Eq.(11).

Figure 7:
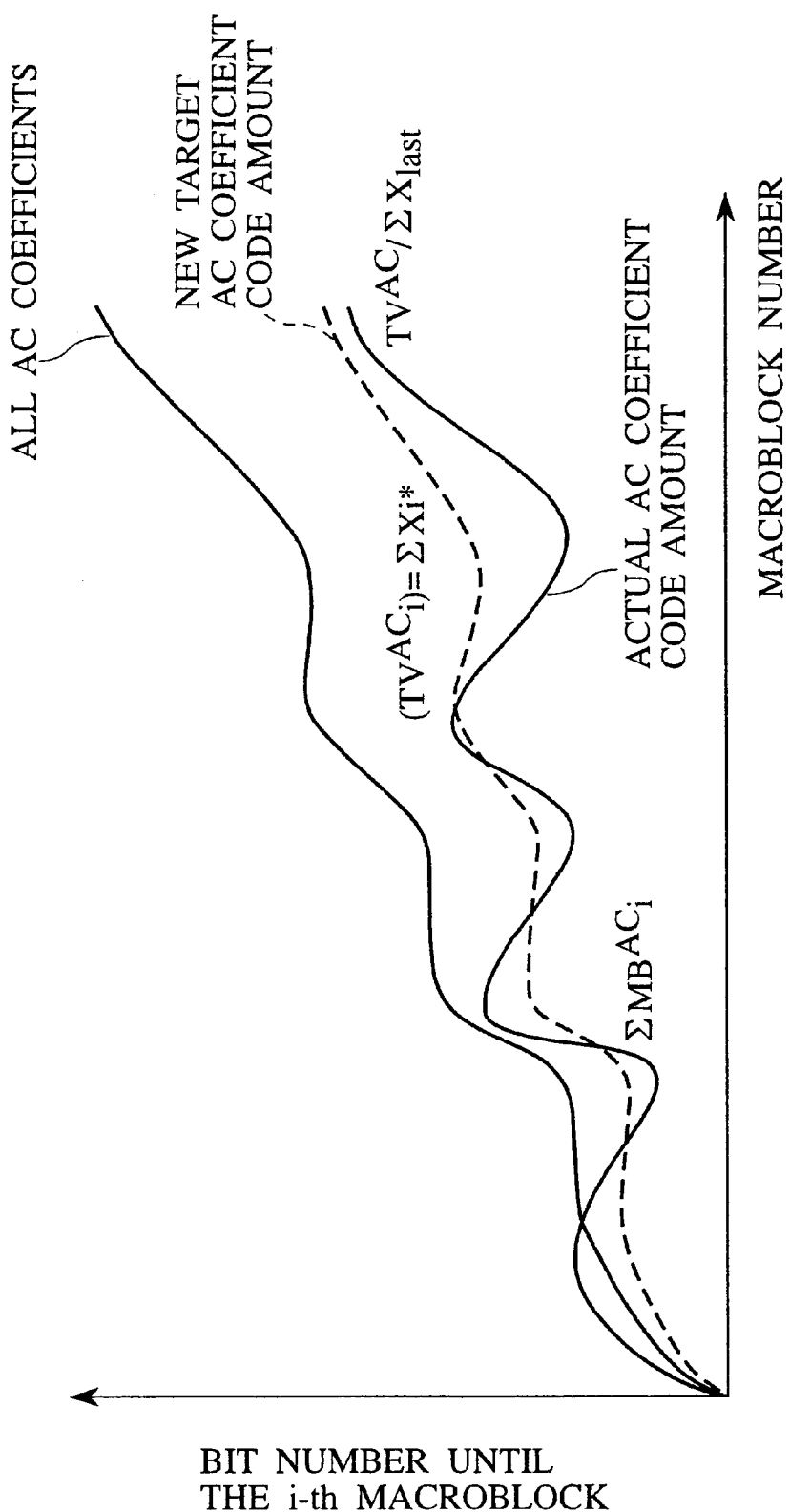
FIG. 7 is a graph employed in explanation of a profile generated by a profile generating portion in an analyzer of the recoding apparatus according to the first embodiment of the present invention.

Then, the analyzer 20 carries out the scaling of the profile of the AC-discrete-cosine-transform-coefficient-accumulated bit number based on the total sum $\Sigma xi$ of the coding difficulty degree Xi and the target code amount $TV^{AC}$ of the AC discrete cosine transform per picture, as the process in step S19. FIG. 7 shows the profile in the case of the present embodiment.

In turn, in the recoding apparatus of the present embodiment, the inverse-quantization is executed by the inverse quantizing unit 13, as the process in step S20. Then, as the process in step S21, the requantization is executed by the quantizing unit 14 to mate with the profile in which the recorded signals are scaled, and also the variable-length coding is executed by the variable-length coding unit 15.

The quantization coefficients in the requantization process will be explained now in detail hereunder. In the recoding apparatus according to the present embodiment, a new quantization coefficients $Q_N i$ are evaluated for the i-th macroblock MBi, as the process in step S22. In the present embodiment, the evaluation values of the quantization coefficients are calculated by using a number of methods (for example, the following first to fifth methods).

In other words, according to the first method of getting the evaluation values of the quantization coefficients, if a quantization coefficients $Q_N i$ indicate the original quantization coefficients of the i-th macroblock MBi, the new quantization coefficients $Q_N i$ are calculated according to the above Eq.(6), like the case of the above conventional example. This is the case under the assumption that the quantization coefficients are in inverse proportion to the generated code amount.

Also, according to the second method of getting the evaluation values, the quantization coefficients $Q_N i$ are calculated according to following Eq.(15) by employing the code amount of the AC discrete cosine transform coefficients.

$$Q_n i = Q_{MB} in/(TV^{AC}/\Sigma MB^{AC}_{last}) \qquad (15)$$

According to the third method of getting the evaluation value, if the quantization coefficients of the (i−1)-th macroblock MB(i−1) prior to the i-th macroblock is set as QN(i−1), the quantization coefficients QN(i−1) of the preceding macroblock MB(i−1) are employed simply as the quantization coefficients $Q_N i$ of the i-th macroblock MBi as the new quantization coefficients. That is, $Q_n i = QN(i-1)$. After this, the new quantization coefficients $Q_N i$ are set by processes in step S29 to step S32, to be describ ed later.

According to the fourth method of getting the evaluation value, the final quantization coefficients $Q_N i_{last}$ that are calculated in the macroblock corresponding to the preceding picture are employed.

According to the fifth method of getting the evaluation value, the final quantization coefficients $Q_N i_{last}$ which are calculated for the preceding picture having the same coding structure (e.g., any one of I-, P-, B-pictures in the MPEG) is employed as the new quantization coefficients $Q_N i$.

In the recoding apparatus in the present embodiment, the new quantization coefficients $Q_N i$ are calculated by any one of the above first to fifth methods in step S22.

Then, after the evaluation values $Q_N i$ of the new quantization coefficients in the i-th macroblock MBi have been obtained in step S22, the recoding apparatus in the present embodiment acquires the non-quantized macroblock Mbi from the delay unit 12 as the process in step S23.

In other words, the quantizing unit 14 in the recoding apparatus of the present embodiment quantizes the i-th macroblock Mbi by using the quantization coefficients $Q_N i$ evaluated as above, as the process in step S24.

Then, the variable-length coding unit 15 in the recoding apparatus of the present embodiment variable-length-codes the macroblock after the requantization, as the process in step S25.

After this, the recoding apparatus calculates the coding difficulty degree $Xi = (\Sigma MB^{AC}i * Qi)^\alpha$ of the new image in the macroblock, as the process in step S26, and further reconstructs the code words of the requantized macroblock, as the process in step S27.

At this time, the recoding apparatus calculates a difference between the new profile value $\Sigma(\Sigma MB^{AC}in)$ i and the original scaled profile value $\Sigma TMBi$ according to the following Eq.(16) as a bit error. $\Delta E$, as the process in step S29.

$$\Delta E = \Sigma TMBi - \Sigma(\Sigma MB^{AC}in)i \qquad (16)$$

Then, the bit error $\Delta E$ derived in this manner is compared with a threshold value $\Delta E_{TH}$ in the process in step S30. If the bit error $\Delta E$ is larger than the threshold value $\Delta E_{TH}$ in this comparison in step S30, the new quantization coefficients $Q_N i$ are calculated, as the process in step S32. This new quantization coefficients $Q_N i$ are calculated in compliance with the above Eq.(8).

At this time, $Q_N i$ in above Eq.(8) corresponds to the last quantization coefficients employed in the i-th macroblock Mbi, and is equal to $Q_N i$ in the first path. If the bit error $\Delta E$ is positive and negative, the sgn ($\Delta E$) coincides with ±1 respectively. That is, the quantization coefficients $Q_N i$ calculated by Eq.(9) become $Q_N i+1$.

After this, the i-th macroblock Mbi is accessed once again by the delay unit 12 as the process in step S22, and the requantization is executed by using the new quantization coefficients $Q_N i$. In this case, step S23 to step S32 are repeated until the bit error $\Delta E$ is reduced smaller than the threshold value $\Delta E_{TH}$. Otherwise, the repeating number of times may be limited within the limited repeating number of times (retry number of times) set in step S31.

In contrast, in the recoding apparatus of the present embodiment, in step S30, if it is decided that the bit error $\Delta E$ is smaller than the threshold value $\Delta E_{TH}$, it is checked to decide whether or not all macroblocks in the picture have been requantized, as the process in step S33. As the result of check in step S33, if it is decided that all macroblocks in the picture have not been requantized, the number of i-th macroblock (index i) is incremented one by one as the process in step S28. Then, the process returns to step S22 and then the requantization process of the (i+1)-th macroblock MB(i+1) is started.

Meanwhile, as the result of the check in step S33, it is decided that all macroblocks in the picture have been requantized, the process of the recoding apparatus of the present embodiment returns to step S10 and then the process of the next picture is started.

In the recoding apparatus of the present embodiment, the above processes have such a tendency that they can follow precisely the profile shown in FIG. 7 but hardly allow the change in the quantization coefficients QMBin. Also, the quantization coefficients become very uniform in one picture. For respective process paths following to the particular macroblock, the data that are reconstructed during the preceding process path of the macroblock are dismissed, and only the data that are reconstructed in the last path are held.

Next, processes in a recoding apparatus according to a second embodiment of the present invention will be explained hereunder.

Figure 6:
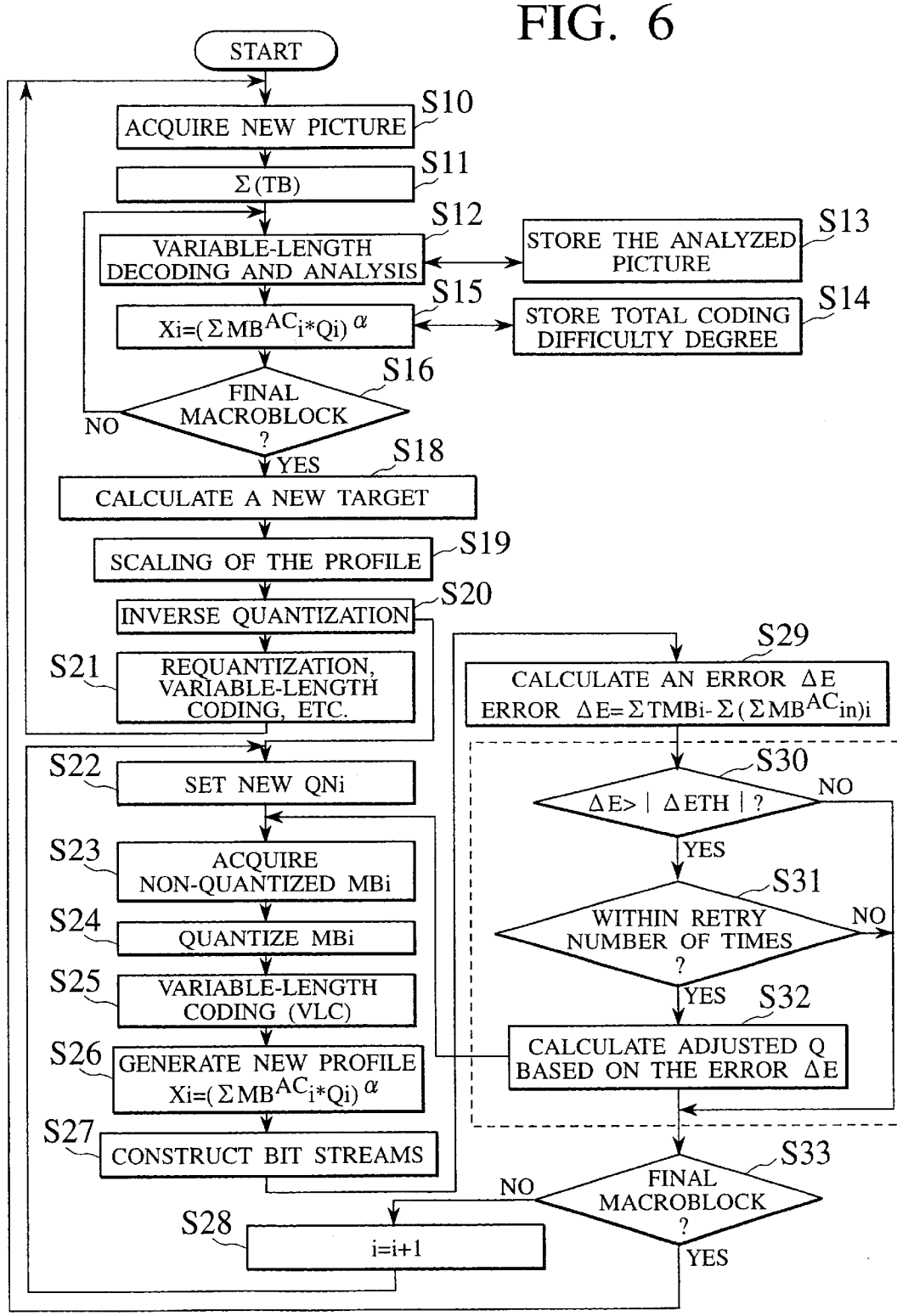
FIG. 6 is a flowchart showing flows of process in the recoding apparatus according to the first embodiment of the present invention.

The second embodiment of the present invention shows an example in which step S30 to step S32 in the flowchart in FIG. 6 are omitted.

In other words, in the second embodiment of the present invention, a final value $B^{AC}_{EXCESS}$ of the difference between the code amount generated in the preceding picture and the target code amount given by following Eq.(17) is added to the next target code amount in the succeeding picture as $B^{AC}_{EXCESS}$. Alternatively, the error may be propagated to a plurality of future pictures.

$$B^{AC}_{EXCESS} = \Delta E_{last} = TV^{AC} - \Sigma(\Sigma MB^{AC}in) \qquad (17)$$

Next, processes in a recoding apparatus according to a third embodiment of the present invention will be explained hereunder.

In the third embodiment of the present invention, the primary coded bit streams of N pictures are received, then the primary coded bit streams of N pictures are analyzed, and a value obtained by dividing $B^{AC}_{EXCESS}$ by the target code amount $TV^{AC}N$ of N pictures is distributed to the target code amount $TV^{AC}$ of one picture. That is, in the third embodiment of the present invention, assume that the target code amounts of the N pictures are $TV^{AC}_0$, $TV^{AC}_1$, $TV^{AC}_2, \ldots, TV^{AC}_N$ respectively and also the target code amount of the succeedingly coded picture calculated by the above calculation is $TV^{AC}_0$. Then, in the third embodiment, $TV^{AC}$ given by following Eq.(18) is calculated as the target code amount of the picture to be recoded succeedingly.

$$TV^{AC} = TV^{AC}_0 + B^{AC}_{EXCESS} / \Sigma(TV^{AC}_N) \qquad (18)$$

As a result, in the third embodiment, the propagation of the error of one picture can be distributed and thus sudden change in the picture quality can be suppressed.

As described above, according to the recoding apparatus of the embodiments of the present invention, upon the code amount producing profile generation in recoding, setting of the optimum quantization coefficients can be achieved even when the optimum code amount of the primary-coded bit stream being compressed-coded previously is not distributed every in-picture block, and thus the secondary-coded bit stream containing less degradation of the picture quality can be generated.

It should be understood that many modifications and adaptations of the invention will become apparent to those skilled in the art and it is intended to encompass such obvious modifications and changes in the scope of the claims appended hereto.

What is claimed is:

1. A coding apparatus comprising:
   a bit stream introducing means for introducing primary-coded bit streams at least in predetermined units;
   a coding difficulty degree calculating means for calculating a degree of difficulty in coding a predetermined block in the predetermined units;
   a profile generating means for generating accumulative profiles based on the degree of difficulty in the coding; and
   a scaling means for executing scaling of the profiles every predetermined block;
   a decoding means for decoding the primary-coded bit streams; and
   a re-coding means for re-coding the decoded primary-coded bit streams to generate secondary-coded bit streams.

2. A coding apparatus according to claim 1, wherein the coding difficulty degree calculating means calculates the degree of difficulty in the coding based on orthogonal transformation coefficients of the predetermined block.

3. A coding apparatus according to claim 1, wherein the coding difficulty degree calculating means calculates the degree of difficulty in the coding by using a sum of code amounts of all predetermined blocks at least in the predetermined units and quantization coefficients of each predetermined block.

4. A coding apparatus according to claim 3, wherein a sum of code amount of all predetermined blocks in the predetermined units represents a code amount of orthogonal transformation coefficients which are dependent on quantization coefficients of each predetermined block in the predetermined units.

5. A coding apparatus according to claim 1, wherein a difference between a code amount obtained by recoding at least one predetermined unit and a current target code amount is added to a next target code amount in predetermined units to be recoded in future.

6. A coding apparatus according to claim 5, wherein a value obtained by dividing difference between a code amount generated in preceding predetermined units and the target code amount by a total sum of the target code amounts of respective predetermined units is distributed to the target code amount of at least one predetermined unit.

7. A coding apparatus comprising:

a bit stream introducing means for introducing primary-coded bit streams at least in predetermined units;

a scaling means for scaling of each predetermined block in the predetermined units based on a code amount of orthogonal transformation coefficients of the predetermined block;

a decoding means for decoding the primary-coded bit streams; and a re-coding means for re-coding the decoded primary-coded bit streams to generate secondary-coded bit streams, wherein a lowest target code amount is set for the code amount of the orthogonal transformation coefficients in the predetermined units.

8. A coding apparatus according to claim 7, wherein a difference between a code amount obtained by recoding at least one predetermined unit and a current target code amount is added to a next target code amount in predetermined units to be recoded in future.

9. A coding apparatus according to claim 8, wherein a value obtained by dividing difference between a code amount generated in preceding predetermined units and the target code amount by a total sum of the target code amounts of respective predetermined units is distributed to the target code amount of at least one predetermined unit.

* * * * *